2,940,907
TETRACYCLINE PROCESS

Fred W. Tanner, Jr., Baldwin, N.Y., assignor to Chas. Pfizer & Co., Inc., New York, N.Y., a corporation of Delaware No Drawing. Filed Apr. 3, 1957, Ser. No. 650,310

5 Claims. (Cl. 195—80)

This application is concerned with a new and useful process for the production of tetracycline. More particularly, it is concerned with a process by which tetracycline is preferentially produced by the addition of a chemical agent to a fermentation medium which in the absence of this agent produces a major proportion of or even only chlortetracycline.

Tetracycline is a broad spectrum antibiotic the therapeutic efficacy of which has been attested by a large number of medical investigators as reported in many articles in the medical literature. Its chemical structure was first reported in the Journal of the American Chemical Society, volume 74, page 4976 (1952). Its chemical relationship to chlortetracycline and oxytetracycline is well known.

Tetracycline is generally produced by one of two methods. These methods are catalytic dehalogenation of chlortetracycline with hydrogen, and fermentation. In both of these methods, there are definite disadvantages. The catalytic dehalogenation of chlortetracycline requires that the antibiotic be isolated from a fermentation source in relatively high purity and then subjected to chemical action requiring expensive processing equipment and catalysts. The fermentation method, although economically more practical, produces not only tetracycline but also chlortetracycline. In most media the latter is generally produced preferentially. This necessitates expensive purification procedures to separate the two antibiotics.

Because of its high activity and because of its high stability in certain media, tetracycline is preferred in many applications over other antibiotics. It is apparent, therefore, that any process which makes it possible to produce tetracycline substantially uncontaminated by chlortetracycline or without the necessity of chemical processing fulfills a definite and long-felt need in the art.

The usual tetracycline-producing microorganisms belong to the genus Streptomyces. The particular strains which are usually used are *Streptomyces aureofaciens*, for example, *Streptomyces aureofaciens* (NRRL 2209), and *Streptomyces viridifaciens*, for example, *Streptomyces viridifaciens* (ATCC 11989). These microorganisms produce fermentation products containing substantially only chlortetracycline. Many attempts have been made to alter the usual fermentation media in order to suppress chlortetracycline in favor of tetracycline in the produced antibiotic mixture. Two of these are described in the patent literature. U.S. Patent 2,739,924 issued to Lein and Gourevitch describes the addition of a bromide and the like, for example, sodium bromide to fermentation media. U.S. Patent 2,734,018 issued to Minieri et al. describes the use of a dechlorinated fermentation media. While both of the described processes are capable of producing broths of increased tetracycline content, neither of them is completely satisfactory in that the amount of chlortetracycline produced is still relatively high. Furthermore, the dechlorination procedure is laborious and expensive.

It has now most unexpectedly been discovered that the addition of 2,6-dimercaptobenzdioxazole—prepared according to the procedure described in detail by Osman in the Journal of the American Chemical Society 79, 966 (1957)—surprisingly makes it possible to produce tetracycline and chlortetracycline in mixtures containing as high as 98% tetracycline or even higher. The 2,6-dimercaptobenzdioxazole may be substituted on the carbon atoms of a phenyl ring with halogen atoms or with such groups as lower alkyl, hydroxyl, nitro, mercapto and others, but the unsubstituted compound is highly active per se. Other variations in the structure of the basic molecule may be made without seriously interfering with the desirable activity.

In practicing the instant invention a 2,6-dimercaptobenzdioxazole is added to a fermentation broth of a tetracycline-producing microorganism of the genus Streptomyces and aerobic fermentation is allowed to continue in the normal way.

The fermentation may be carried out in accordance with either the well known submerged or surface techniques. When the antibiotic activity of the fermentation broth is isolated, for example, by extraction and the antibiotic content analyzed, it is found that the amount of tetracycline produced is substantially higher than is produced in the absence of 2,6-dimercaptobenzdioxazole. So surprisingly efficient is the process of this invention that concentrations of the tetracycline-producing agent as low as twenty parts per million produce broths containing up to 200 µg./ml. of tetracycline of greater than 95% purity. The activity and purity of the tetracycline produced were established by chromatographic methods in which known solutions of tetracycline and chlortetracycline and mixtures of these were used as reference standards.

Control experiments run under exactly the same conditions and evaluated in exactly the same manner produced broths containing 200 µg./ml. of chlortetracycline and only a trace of tetracycline. Similarly high ratios of tetracycline to chlortetracycline are achieved with concentrations of 2,6-dimercaptobenzdioxazole as low as 0.2 part per million or even lower. With most chlortetracycline producing microorganisms concentrations of about twenty parts per million are entirely adequate but the optimum concentration may vary somewhat with the particular strain or mutant of microorganism being used. Thus certain microorganisms may yield optimum amounts of tetracycline at concentrations higher or lower than twenty parts per million. It is conceivable that with some particular strains or mutants the toxicity level may be higher or lower than with the microorganisms heretofore tested. The optimum concentration may depend in some cases on whether the 2,6-dimercaptobenzdioxazole is added before or after inoculation of the fermentation media. For most applications, however, concentrations as high as 100 parts per million or even higher are tolerable. It is to be noted that the desirable effect of obtaining extremely high tetracycline to chlortetracycline ratio in the produced antibiotic is achieved without the necessity of expensive dechlorination procedures being applied to the fermentation media.

Many suitable fermentation media of the type generally used in the production of antibiotics by fermentation methods can be used in practicing this invention. These media will usually contain a source of carbohydrates and a source of nitrogen preferably in organic form. A variety of different metallic salts also have some value in stimulating production of the antibiotic. Among the carbohydrate solutions which are useful are molasses, glucose, starches, glycerol, etc. Organic nitrogen sources include soybean meal, wheat gluten, peanut meal, hydrolyzate of casein and other proteins. Certain crude materials contain growth stimulatory substances which are of some value in obtaining maximum yields of the antibiotic. These include such substances as corn steep liquor, distiller's solubles, yeast extract, etc. Salts such as sodium nitrate, sodium chloride, potassium phosphate and magnesium sulfate can also be used. Occasionally the addition of a buffering agent such as calcium carbonate is helpful and if foaming is encountered during the growth of the organisms the addition of oils such as lard oil, soybean oil, etc. may be advisable. Useful media are described in U.S. Patents 2,482,055, 2,709,672 and 2,776,243 as well as in U.S. patent applications, Serial Nos. 391,708, 391,709 and 391,710 filed November 12, 1953, now abandoned.

In practicing the instant invention the active agent may be added to the fermentation media before or after inoculation. It is, however, preferably added before significant amounts of antibiotic activity have been produced since prior to the addition of 2,6-dimercaptobenzdioxazole the antibiotic produced is preponderantly chlortetracycline.

The following examples are given solely for the purpose of illustration only and are not to be construed as limitations of this invention, many apparent variations of which are possible without departing from the spirit or scope thereof.

Example I

A spore suspension of *Streptomyces aureofaciens* was introduced into 100 ml. of the following composition in a 300 ml. Erlenmeyer flask.

| | Grams per liter |
|---|---|
| Sucrose | 10 |
| Corn steep liquor | 10 |
| Ammonium monohydrogen sulfate | 2 |
| Calcium carbonate | 2 |

After forty-eight hours' incubation at 28° C. on a rotary shaker, approximately 2.5 ml. of this culture served to inoculate one liter of a fermentation medium of the following composition.

| | |
|---|---|
| Corn starch | 20 g. per liter. |
| Corn steep liquor | 25 g. per liter. |
| Ammonium sulfate | 5 g. per liter. |
| Magnesium sulfate heptahydrate | 2 g. per liter. |
| Calcium carbonate | 7 g. per liter. |
| 2,6-dimercaptobenzdioxazole | 20 mg./l. |

The medium was autoclaved forty minutes at twenty pounds' steam pressure. After approximately ninety hours' incubation at 28° C. on a rotary shaker, samples of the broth were withdrawn and tested by paper chromatographic methods for antibiotic content. It was found that the broth contained 200/μg./ml. of tetracycline and that this represented more than 98% of the total antibiotic activity produced. The remainder of the antibiotic activity was attributed to chlortetracycline.

When this procedure was carried out in the absence 2,6-dimercaptobenzdioxazole, the product obtained had a chlortetracycline content of more than 95%.

Example II

The procedure of Example I was repeated except that the 2,6-dimercaptobenzdioxazole was added twenty-four hours after incubation and the incubation was continued for an additional sixty-six hours at 28° C. Analysis of aliquot portions of the broth established a tetracycline content of 200 μg./ml. of about 95% purity.

When this procedure was carried out in the absence 2,6-dimercaptobenzdioxazole, the product obtained had a chlortetracycline content of more than 95%.

Example III

A spore suspension of *Streptomyces viridifaciens* (ATCC 11989) was inoculated as described in Example I. The medium used was identical with that described in Example I, and it was incubated for 100 hours at 28° C. on a rotary shaker. Analysis of aliquot portions of the broth established a tetracycline content of 200 μg./ml. of about 97% purity.

When this procedure was carried out in the absence 2,6-dimercaptobenzdioxazole, the product obtained had a chlortetracycline content of more than 95%.

Example IV

A spore suspension of *Streptomyces aureofaciens* (NRRL 2209) prepared as described in Example I was used to inoculate 100 ml. of a sterile nutrient medium having the following composition.

| | Grams per liter |
|---|---|
| Soybean meal | 40 |
| Sodium nitrate | 3 |
| 2,6-dimercaptobenzdioxazole | 85 |

100 ml. of tap water.

The medium was autoclaved forty minutes at twenty pounds' steam pressure. After 100 hours' incubation at 35° C. in a rotary shaker, samples were withdrawn and tested for antibiotic activity. It was found that the broth contained 200 μg./ml. of tetracycline and that this represented more than 98% of the total antibiotic activity produced.

When this procedure was carried out in the absence 2,6-dimercaptobenzdioxazole, the product obtained had a chlortetracycline content of more than 95%.

Example V

A spore suspension of *Streptomyces viridifaciens* prepared as in Example I was used to inoculate 100 ml. of a sterile nutrient medium having the following composition.

| | |
|---|---|
| Soybean meal | 40 g. per liter. |
| Sodium nitrate | 3 g. per liter. |
| 2,6-dimercaptobenzdioxazole | 2 mg. per liter. |

100 ml. of tap water.

The medium was autoclaved forty minutes at twenty pounds' steam pressure. After 100 hours' incubation at 35° C. in a rotary shaker, samples were withdrawn and tested for antibiotic activity. It was found that the broth contained 200 μg./ml. of tetracycline and that this represented more than 90% of the total antibiotic activity produced.

When this procedure was carried out in the absence 2,6-dimercaptobenzdioxazole, the product obtained had a chlortetracycline content of more than 95%.

Results similar to those described in Examples I, II, III, IV and V were obtained with the following strains of Streptomyces; ATCC 11652, 11653 and 11654 as well as with NRRL, B1286, B1287 and B1288.

What is claimed is:

1. In a process for producing tetracycline by aerobic fermentation with a chlortetracycline-producing microorganism of the genus Streptomyces, the improvement which comprises conducting the fermentation in the presence of 2,6-dimercaptobenzdioxazole, whereby the production of chlortetracycline is suppressed in favor of tetracycline.

2. In a process for producing tetracycline by aerobic fermentation with a chlortetracycline-producing microorganism of the species *Streptomyces aureofaciens*, the improvement which comprises conducting the fermentation in the presence of 2,6-dimercaptobenzdioxazole, whereby the production of chlortetracycline is suppressed in favor of tetracycline.

3. In a process for producing tetracycline by aerobic fermentation with a chlortetracycline-producing microorganism of the species *Streptomyces viridifaciens*, the improvement which comprises conducting the fermentation in the presence of 2,6-dimercaptobenzdioxazole, whereby the production of chlortetracycline is suppressed in favor of tetracycline.

4. A process as in claim 1 wherein from 0.2 to 100 parts per million of 2,6-dimercaptobenzdioxazole is used.

5. In a process of aerobic fermentation of a nutrient medium with a microorganism of the genus Streptomyces, said fermentation normally producing an antibiotic consisting substantially of chlortetracycline with minor amounts of tetracycline, the improvement comprising suppressing the production of chlortetracycline in favor of tetracycline by the addition of 2,6-dimercaptobenzdioxazole to the fermentation medium.

References Cited in the file of this patent

UNITED STATES PATENTS

| | | |
|---|---|---|
| 2,734,018 | Minieri et al. | Feb. 7, 1956 |
| 2,739,924 | Lein et al. | Mar. 27, 1956 |

FOREIGN PATENTS

| | | |
|---|---|---|
| 316,291 | Switzerland | Nov. 15, 1956 |

OTHER REFERENCES

Martell et al.: Chem. of the Metal Chelate Compounds, 1952, pp. 135 to 138, 420, 421, 424 to 426 and 499 to 504.

Sekizawa: Jour. of Biochemistry, vol. 42, No. 2, March 1955, pp. 217–219.